United States Patent [19]

Kenney

[11] Patent Number: 5,414,957
[45] Date of Patent: May 16, 1995

[54] CASCADE BOUQUET HOLDER

[76] Inventor: Leonard D. Kenney, 341 Western Ave., Clarendon Hills, Ill. 60514

[21] Appl. No.: 137,604

[22] Filed: Oct. 15, 1993

[51] Int. Cl.6 .............................................. A01G 5/00
[52] U.S. Cl. ...................................... 47/41.12; 428/4; 428/7
[58] Field of Search ................. 47/41.01, 41.12, 41.11, 47/41.13; 428/4, 7

[56] References Cited

U.S. PATENT DOCUMENTS

| D. 127,799 | 6/1941 | Hayt | 47/41.01 |
| 427,402 | 5/1890 | Christie | 47/41.12 |
| 1,851,205 | 3/1932 | Nagai | 47/41.12 |
| 2,765,585 | 4/1956 | Smithers | 47/41 |
| 2,850,826 | 9/1958 | Testa | 47/41.12 |
| 3,374,575 | 3/1968 | Tong | 47/41.12 |
| 3,651,601 | 3/1972 | La Montagne | 47/41.12 |
| 4,204,365 | 5/1980 | Hirvi | 47/41.12 |
| 4,258,503 | 3/1981 | Bales | 47/41.12 |
| 4,566,221 | 1/1986 | Kossin | 47/41.12 |
| 4,887,385 | 12/1986 | James | 47/41.12 |
| 5,070,644 | 12/1991 | Hasty | 47/41.12 |

FOREIGN PATENT DOCUMENTS

| 21914 | 9/1897 | United Kingdom | 47/41.01 |
| 1151128 | 5/1969 | United Kingdom | 47/41.12 |
| 2187092 | 9/1987 | United Kingdom | 47/41.12 |

*Primary Examiner*—Henry E. Raduazo
*Attorney, Agent, or Firm*—Marshall, O'Toole, Gerstein, Murray & Borun

[57] ABSTRACT

A flower bouquet holder comprising a rigid holder assembly with an encaged block of water retentive foam to be used in constructing cascade style flower bouquets. The holder is pear shaped on the front side with a recessed lower portion. The improvement over other bouquet holders lies in the greater depth of foam into which the stems of flowers comprising the cascade may be inserted and the ability to use longer floral picks.

14 Claims, 3 Drawing Sheets

CASCADE BOUQUET HOLDER

BACKGROUND OF THE INVENTION

1. Field of the Invention

This invention relates generally to a flower bouquet holder and more specifically to a bouquet holder having a block of water retentive synthetic resin foam into which the stems of cut flowers are inserted such as used in weddings.

2. Prior Art

Flower bouquet holders having a block of water retentive foam have long been known and used. Such holders are described in Smithers U.S. Pat. No. 2,765,585, La Montagne U.S. Pat. No. 3,651,601, Hirvi U.S. Pat. No. 4,204,365, Kossin U.S. Pat. No. 4,566,221 and Hasty U.S. Pat. No. 5,070,644. In constructing bouquets in these holders florists insert the stems of cut flowers or the stems to which floral picks have been attached. A significant number of bouquets so made are in the form of a cascade having a number of stems descending downward many of greater length than stems in upper parts of the bouquet. It can be seen that all of the prior art bouquet holders are round from a front view with a cylindrical block of foam with a conical rear portion that fits the conical cap of the holder.

Of the patents cited above, Kossin U.S. Pat. No. 4,566,221 refers to a problem relating to bouquets with cascading flowers. However its solution having a rigid inner core is restrictive on the floral designer. The specifications do not indicate which if any foam is in the conical cap which in other holders is the receptacle for those stems inserted in the front of the holder. This invention is not known to have attained any commercial appeal or to be in use. Other prior art bouquet holders are not satisfactory in constructing bouquets having long or full cascades as the flowers can loosen or fall out when the bouquet is carried. To counter this some florists have gone to unusual means to secure the cascade portion of bouquets such as wiring stems to the ribbed cage of the holder and using various glues on the picks or stems all of which cause additional work and inconvenience.

SUMMARY OF THE INVENTION

The principal object of the invention is to provide a means for constructing cascade style flower bouquets which will hold the flowers in the cascade portion more securely while allowing for the convenience of the floral designer. In the preferred embodiment the bouquet holder is pear shaped on its front side with a recessed lower portion. In this embodiment the stems or floral picks comprising the cascade portion of the bouquet may be inserted into a proportionately longer section of the water retentive foam and longer floral picks may be used than could be used in the prior art bouquet holders.

Figure 1:
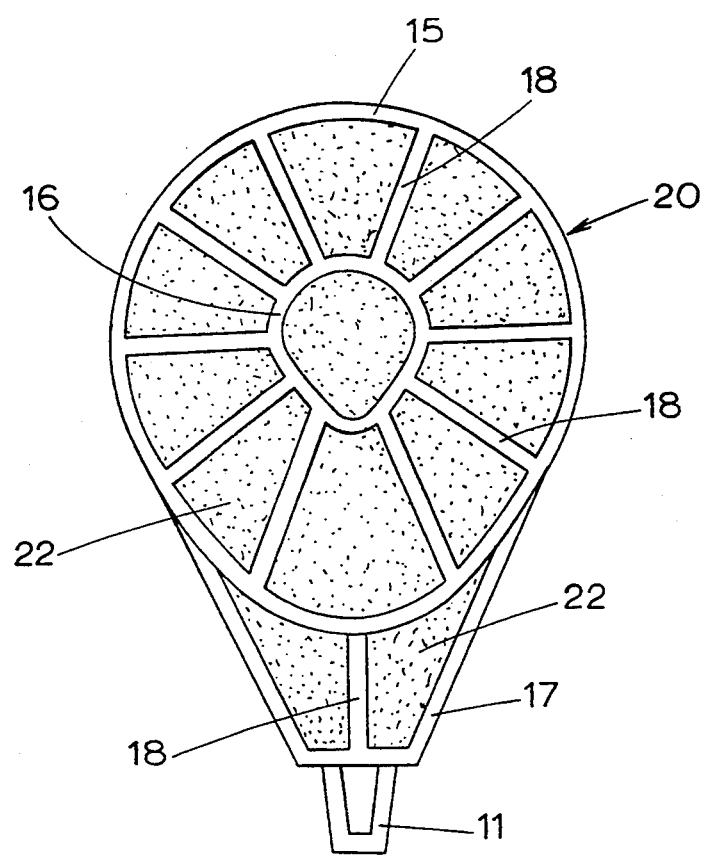
FIG. 1 is a front view of the preferred embodiment of a cascade bouquet holder.
Figure 2:
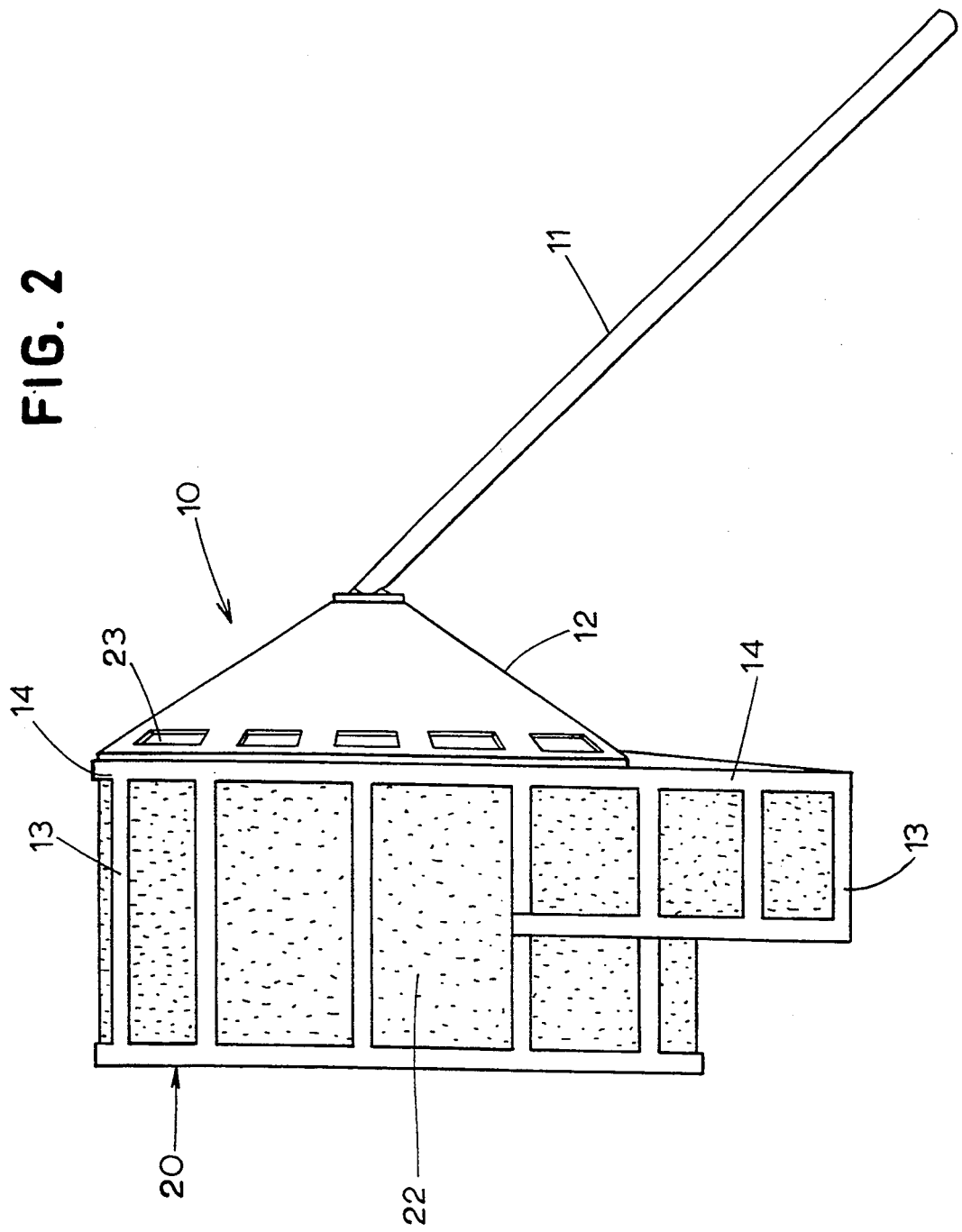
FIG. 2 is a side view of the preferred embodiment of a cascade bouquet holder.
Figure 3:
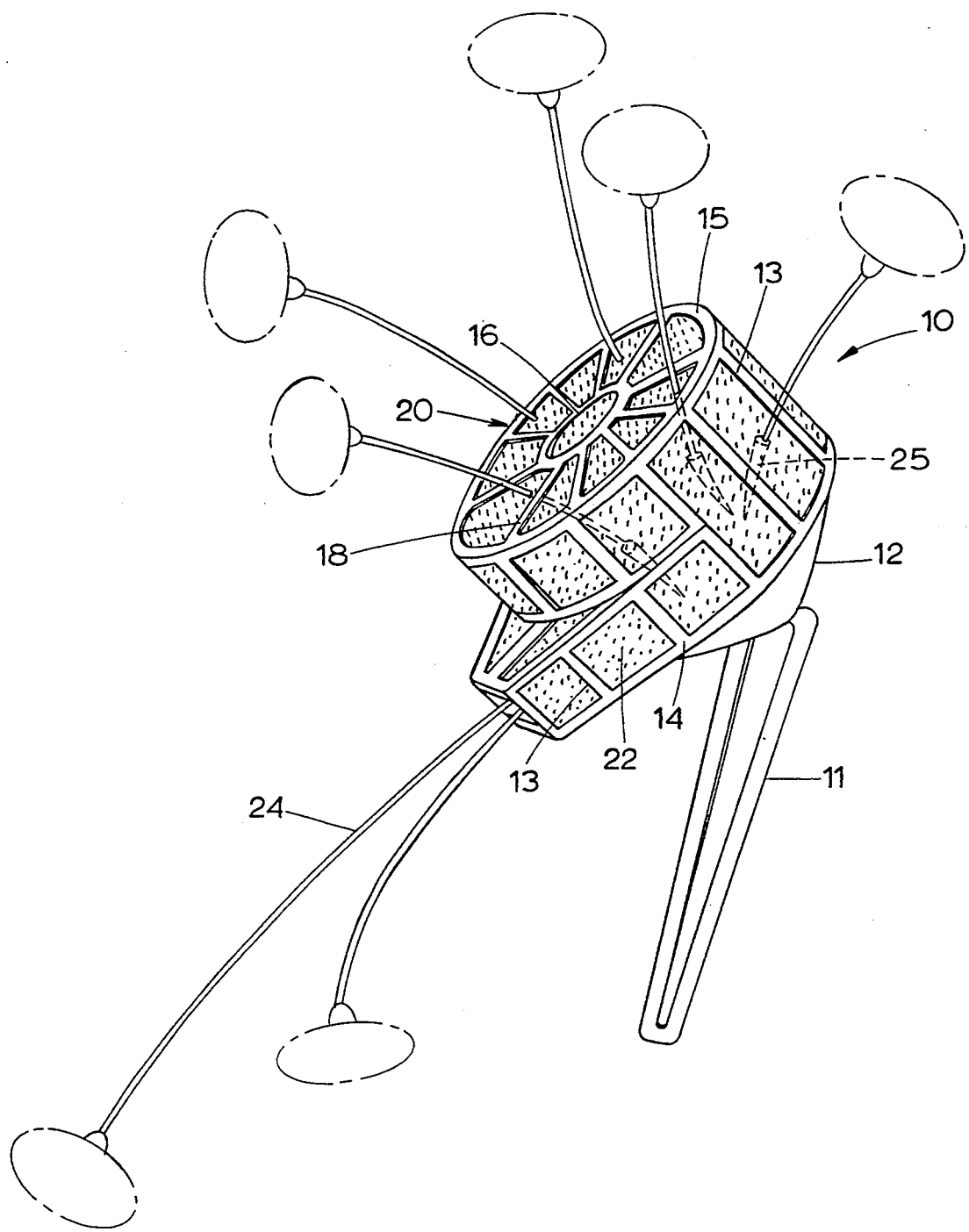
FIG. 3 is a perspective view of the preferred embodiment of a cascade bouquet holder.

REFERENCE NUMERALS 10 head
11 handle
12 cap
13 side ribs
14 back ring
15 front outer ring
16 front inner ring
17 rim of recessed front
18 spokes
20 cage
22 water retentive foam
23 openings in cap
24 flower stems
25 floral picks

DETAILED DESCRIPTION

Referring to the drawings the cascade bouquet holder is comprised of a head 10 with a handle 11. The head 10 is comprised of a cap 12 the top portion of which is conical with a flat bottom. The cap 12 may be formed with openings 23 in the conical portion to facilitate water absorption. The water retentive foam block 22 is secured by a cage 20. The cage 20 has an upper front comprising outer and inner pear shaped rings 15 and 16 respectively joined by spokes 18. The lower portion of the cage 20 is recessed comprising rims 17 with spoke 18. The foam 22 is so shaped as to fill the caged holder. The back ring 14 is of the same perimeter shape as the cap 12 and is connected to the front outer ring 15 and rim 17 by side ribs 13. The cage 20 is attached to the cap 12 by adhesive or other known means. Said holder is pear shaped from a front view. The cap 12, the cage 20 and the handle 11 can be molded from any suitable plastic material known in the art such as polyethelene or styrene. The foam 22 used is any of the water retentive synthetic resin foams known in the art. In use flower stems 24 with attached floral picks 25 are inserted into the foam 22. As can be seen in the preferred embodiment described here those stems comprising the cascade portion of the bouquet may be inserted to a greater depth than in the prior art bouquet holders. It can also be seen that the shape of the preferred embodiment closely resembles the shape of cascade style bouquets such as used in weddings.

While the preferred embodiment of a cascade bouquet holder has been described, it should be noted that many variations may be apparent to those skilled in the art which may be made without departing from the scope of the invention as set forth in the claims.

I claim:

1. A cascade bouquet holder for holding cut flowers wherein the bouquet holder is adapted to be held by a carrier in a cascade position comprising:
   a handle; and
   water retentive material secured to the handle and having a main section, a further section smaller than the main section and depending therefrom and a surface opposite the handle which is directed away from the carrier when the bouquet holder is in the cascade position, such surface having an elongate configuration including a top portion which is wider than a bottom portion when viewed along an axis generally normal to the surface.

2. The cascade bouquet holder of claim 1, further including a cage coupled to the handle and surrounding at least a portion of the water retentive material.

3. The cascade bouquet holder of claim 1, further including a head disposed between the handle and the water retentive material.

4. The cascade bouquet holder of claim 1, wherein the water retentive material includes a cascade section extending from the further section.

5. The cascade bouquet holder of claim 4, wherein the further cascade section is of lesser depth then the first-named cascade section.

6. A cascade bouquet holder for holding cut flowers wherein the bouquet holder is adapted to be held in a cascade position, comprising:
a head having a central axis;
a handle connected to the head and having a handle axis inclined with respect to the central axis of the head;
a block of water retentive material for retaining stems of the cut flowers, the block of water retentive material including a main section and a further section depending downwardly from the main section when the bouquet holder is in the cascade position whereby the block of water retentive material appears substantially pear-shaped when viewed along the central axis of the head; and
a cage attached to the head wherein at least a portion of the block is maintained between the cage and the head.

7. The holder of claim 6, wherein an additional cascade section extends downwardly from the further section when the bouquet holder is in the cascade position wherein the further section is closer to the head than the additional section.

8. The holder of claim 6, wherein the block of water retentive material is comprised of foam.

9. A cascade bouquet holder for holding cut flowers comprising:
a head;
a handle connected to the head;
a cage having
a pear shaped substantially planar first ring attached to the head and plurality of first ribs connected to and substantially perpendicular to the first ring,
a second ring spaced from the first ring and connected to the first ribs; and
water retentive material for inserting and retaining stems of the cut flowers having at least a portion disposed between the cage and the head and substantially filling the space between the cage and the head wherein the second ring has a perimeter smaller than the first ring and the cage defines a pear shaped main section and at least one cascading section extending from the main section.

10. The holder of claim 9, wherein the cascading section is of lesser depth than the main section.

11. The holder of claim 9, wherein the cascading section is bounded by a rim and a plurality of second ribs connected between the rim and the first ring wherein the second ribs are shorter than the first ribs.

12. The holder of claim 11, wherein the rim and the second ring are substantially planar and the rim is disposed between the first and second rings.

13. A holder for a cascade style bouquet of cut flowers such as used in weddings carried by brides and bridesmaids, the bouquet including cascading flowers and other flowers having stems held in the holder by picks, comprising:
a rigid head having front and back sides;
a handle attached to the back side of the head;
a block of water retentive foam attached to the front side of the head opposite the handle and having a front side opposite the handle; and
a cage attached to the front side of the head and surrounding the block of water retentive foam, whereby the block of water retentive foam includes a main section, a cascade section smaller than the main section extending downwardly from the main section and a surface which is pear-shaped on the front side thereof and whereby the stems and picks of the cascading flowers may be inserted into a greater depth of said water retentive foam than other stems and picks of the bouquet.

14. The holder of claim 13, wherein the block of water retentive foam includes a further cascade section extending downwardly from the first-named cascade section.

* * * * *